(12) United States Patent
Franceus

(10) Patent No.: US 9,911,221 B2
(45) Date of Patent: Mar. 6, 2018

(54) ANIMATED PAGE TURNING

(75) Inventor: Paul M. Franceus, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1197 days.

(21) Appl. No.: 13/118,804

(22) Filed: May 31, 2011

(65) Prior Publication Data

US 2012/0105464 A1 May 3, 2012

Related U.S. Application Data

(60) Provisional application No. 61/407,398, filed on Oct. 27, 2010, provisional application No. 61/447,616, filed on Feb. 28, 2011.

(51) Int. Cl.
*G06F 3/0483* (2013.01)
*G06T 13/80* (2011.01)
*G06T 13/20* (2011.01)
*G06T 15/04* (2011.01)

(52) U.S. Cl.
CPC .............. *G06T 13/80* (2013.01); *G06T 13/20* (2013.01); *G06T 15/04* (2013.01)

(58) Field of Classification Search
USPC ........................................................ 345/473
See application file for complete search history.

(56) References Cited

U.S. PATENT DOCUMENTS

| | | | |
|---|---|---|---|
| 5,053,762 A | 10/1991 | Sarra | |
| D341,848 S | 11/1993 | Bigelow et al. | |
| 5,369,735 A * | 11/1994 | Thier | H04N 5/2628 345/419 |
| 5,463,725 A * | 10/1995 | Henckel | G06F 3/0483 345/473 |

(Continued)

FOREIGN PATENT DOCUMENTS

| | | |
|---|---|---|
| CN | 1643490 A | 7/2005 |
| CN | 101122841 A | 2/2008 |
| EP | 1672474 A2 | 6/2006 |

OTHER PUBLICATIONS

Liesaputra, V., Witten, I., Computer graphics techniques for modeling page turining, Sep. 26, 2009, Springer-Verlag, International Journal on Digital Libraries, vol. 10, pp. 93-121.*
Hong, L., Card, S., Chen, J., Turning Pages of 3D Electronic Books, Mar. 2006, IEEE Proceedings of the 2006 IEEE Symposium on 3D User Interfaces, pp. 159-166.*
PCT International Search Report and Written Opinion, PCT/US2011/047100, dated Feb. 27, 2012, 7 pages.
Hong, L., et al., "Deforming Pages of 3D Electronic Books (sketches_0135)," Palo Alto Research Center, 1 page (2004).

(Continued)

*Primary Examiner* — Said Broome
(74) *Attorney, Agent, or Firm* — Shumaker & Sieffert, P.A.

(57) ABSTRACT

A digital reading device includes reader functionality and displays a page turn animation. The digital reading device includes a display displaying a digital content page. The display may include touch-sensitive functionality. Page turn input information including location information is received at the digital reading device. A virtual cylinder is generated based on the information. A corresponding cylinder surface location is determined for each of one or more page locations. The generated cylinder is rendered on the display and the digital content of each of the one or more page locations is textured on the rendered cylinder at the corresponding cylinder surface locations. The digital reading device adaptively tracks the movement of a page input on the display and produces a page turn animation that responds to the movement of the page turn input.

22 Claims, 8 Drawing Sheets

(56) References Cited

U.S. PATENT DOCUMENTS

| | | | |
|---|---|---|---|
| 5,900,876 A * | 5/1999 | Yagita | G06F 3/0483 715/776 |
| 6,217,443 B1 | 4/2001 | Green | |
| 6,496,803 B1 * | 12/2002 | Seet | G06F 3/0483 705/14.73 |
| D498,763 S | 11/2004 | Totten et al. | |
| D512,072 S | 11/2005 | Totten et al. | |
| 6,989,815 B2 | 1/2006 | Liang et al. | |
| 7,081,882 B2 * | 7/2006 | Sowden | G06F 3/03547 345/156 |
| 7,171,630 B2 * | 1/2007 | O'Leary | G06F 3/0483 715/212 |
| D555,663 S | 11/2007 | Nagata et al. | |
| D559,858 S | 1/2008 | Gusmorino et al. | |
| D598,928 S | 8/2009 | Hirsch et al. | |
| D610,161 S | 2/2010 | Matas | |
| 7,657,846 B2 | 2/2010 | Banks et al. | |
| D611,486 S | 3/2010 | Hirsch et al. | |
| D612,391 S | 3/2010 | Fletcher et al. | |
| 7,676,767 B2 | 3/2010 | Hofmeister et al. | |
| 7,703,047 B2 | 4/2010 | Keely et al. | |
| D616,450 S | 5/2010 | Simons et al. | |
| D623,057 S | 9/2010 | Kletz | |
| D624,927 S | 10/2010 | Allen et al. | |
| D625,326 S | 10/2010 | Allen | |
| D628,210 S | 11/2010 | Luke et al. | |
| D633,917 S | 3/2011 | Poling et al. | |
| 7,898,541 B2 | 3/2011 | Hong | |
| D637,606 S | 5/2011 | Luke et al. | |
| D645,878 S | 9/2011 | Cavanaugh et al. | |
| D648,347 S | 11/2011 | Chaudhri | |
| D649,155 S | 11/2011 | Van Os | |
| D663,312 S | 7/2012 | David et al. | |
| D669,906 S | 10/2012 | Cranfill et al. | |
| D670,713 S | 11/2012 | Cranfill et al. | |
| D670,716 S | 11/2012 | Majeed et al. | |
| 8,352,876 B2 | 1/2013 | Batarseh et al. | |
| 8,358,280 B2 | 1/2013 | Li et al. | |
| D682,842 S | 5/2013 | Kurata et al. | |
| D683,345 S | 5/2013 | Akana et al. | |
| D693,833 S | 11/2013 | Inose et al. | |
| D705,250 S | 5/2014 | Khanna | |
| D706,810 S | 6/2014 | Jones et al. | |
| D707,249 S | 6/2014 | Yamada | |
| 2003/0020687 A1 | 1/2003 | Sowden et al. | |
| 2004/0039750 A1 | 2/2004 | Anderson et al. | |
| 2006/0133664 A1 * | 6/2006 | Hong | G06F 3/0483 382/154 |
| 2006/0161868 A1 | 7/2006 | Van Dok et al. | |
| 2008/0256479 A1 | 10/2008 | Hemmings | |
| 2009/0219248 A1 * | 9/2009 | Li | G06F 3/0483 345/168 |
| 2009/0239202 A1 * | 9/2009 | Stone | G09B 5/00 434/178 |
| 2010/0045616 A1 | 2/2010 | Li et al. | |
| 2010/0053216 A1 * | 3/2010 | Iwase | G06F 3/04883 345/634 |
| 2010/0175018 A1 * | 7/2010 | Petschnigg | G06F 3/0483 715/776 |

OTHER PUBLICATIONS

Google Inc., "Turning the Pages of an eBook—Realistic Electronic Books," Posted on YouTube by Google Inc. on Jul. 25, 2007, 2 pages, video can be access online at <URL: http://www.youtube.com/watch?v=9Y-BM3Z5xy0>.

$1^{st}$ Office Action for Chinese Patent Application No. CN 201180052148.4, dated Mar. 30, 2015, 21 Pages.

$2^{nd}$ Office Action for Chinese Patent Application No. CN 201180052148.4, dated Nov. 25, 2015, 18 Pages.

Extended European Search Report for European Patent Application No. EP 11836795.2, dated Jul. 28, 2015, 8 Pages.

Liesaputra, V., et al., "Computer graphics techniques for modeling page turning," International Journal on Digital Libraries, Sep. 26, 2009, pp. 93-121.

$3^{rd}$ Office Action for Chinese Patent Application No. CN 201180052148.4, dated May 30, 2016, 17 Pages.

Office Action for Chinese Patent Application No. CN 201180052148.4, dated Nov. 30, 2016, 19 Pages.

Office Action from U.S. Appl. No. 29/446,411 dated May 21, 2015, 13 pp.

Response to Extended Search Report dated Jul. 28, 2015, from counterpart European Application No. 11836795.2, filed Jan. 7, 2016, 22 pp.

International Preliminary Report on Patentability from International Application No. PCT/US2011/047100, dated Oct. 27, 2010, 6 pp.

The Notification of Reason for Rejection, and translation thereof, from counterpart Korean Application No. 10-2013-7011738, dated Jul. 13, 2017, 16 pp.

Examination Report from counterpart European Application No. 11836795.2, dated Jul. 25, 2017, 6 pp.

Notification of Reexamination, and translation thereof, from counterpart Chinese Application No. 2017091900894390, dated Sep. 22, 2017, 35 pp.

Response to Examination Report from counterpart European Application No. 11836795.2, filed Nov. 2, 2017, 4 pp.

\* cited by examiner

The Poetics – The Art quently of their success or failure in their lives. Now the action (that which was done) is represented in the play by the Fable or Plot. The Fable, in our present sense of the term, is simply this, the combination of the incidents, or things done in the story; whereas Character is what makes us ascribe certain moral qualities to the agents; and Thought is shown in all they say when proving a particular point or, it may be, enunciating a general truth. There are six parts consequently of every tragedy, as a whole, that is, of such or such quality, viz. a Fable or Plot, Characters, Diction, Thought, Spectacle and Melody; two of them arising from the means, ular point, or enunciating necessary. The distinction between historian and poet is not in the one writing prose and the other verse—you might put the work of into verse, and it would still be a species of history; it consists really in this, that the one describes the thing that has been, and the other a kind of thing that might be. Hence poetry is something more philosophic and of graver import than history, since its statements are of the nature rather of universals, whereas those of history are singulars. By a universal statement I mean one such as we have described, or better, not worse than what su by s cters; by a singular statement, one necessarily the or had done to him. In Comedy this though it af the by this time; it is only when their plot state me to acc of probable incidents that to give it Come is o us) ames, choosing for the purpose any when the mus cur to them, instead of writing like incidents trary ts about particular persons. In Tragchoosing must still adhere to the historic names; them, ins on hi : what convinces is the possible; particula have are not yet sure as to the possibility adhere also not happened, that which has happened conving accep possible, else it would not have sure as days evertheless even in Tragedy there are hat wh some but one or two known names in them, would been ventions; and there are some without a Trage deed me, e.g. in which both incidents and name has a e poet's invention. So that one must not aim at some are wn t account. From the point of view, incid dies, a ce to the traditional stories on which no l is, as w revious Chapter. quantity, i.e. the separate sections into aim proof is ed, a tragedy has the following parts: wh mances ode, judgement, of the number of the be the an

The Poetics – The Art quently of their success or failure in action (that which was done) is repr by the Fable or Plot. The Fable, in c the term, is simply this, the combina dents, or things done in the story; w is what makes us ascribe certain m agents; and Thought is shown in a proving a particular point or, it may general truth. There are six parts c every tragedy, as a whole, that is, ity, viz. a Fable or Plot, Character Spectacle and Melody; two of the means, ular point, or enunciating tinction between historian and po writing prose and the other verse work of into verse, and it would s tory; it consists really in this, tha thing that has been, and the oth might be. Hence poetry is some and of graver import than histor are of the nature rather of univ history are singulars. By a univ one such as we have describe by some error of ju the enjoyment of g the men of note of accordingly, must h us) a double issue; must be not from m trary from happines must lie not in any d on his part; the man have described, or b also confirms our th accepting any tragic days the finest trage some few houses, on been involved, as eith deed of horror. The th has a Plot of this desc are wrong who blame dies, and giving many is, as we have said, th proof is this: on the sta mances, such plays, pr be the most truly tragic;

names to the characters; by a singular statement, one as to what, say, did or had done to him. In Comedy this has become clear by this time; it is only when their plot is already made up of probable incidents that to give it a basis of proper names, choosing for the purpose any names that may occur to them, instead of writing like the old iambic poets about particular persons. In Tragedy, however, they still adhere to the historic names; and for this reason: what convinces is the possible; now whereas we are not yet sure as to the possibility of that which has not happened, that which has happened is manifestly possible, else it would not have come to pass. Nevertheless even in Tragedy there are some plays with but one or two known names in them, the rest being inventions; and there are some without a single known name, e.g. in which both incidents and names are of the poet's invention; and it is no less delightful on that account. So that one must not aim at a rigid adherence to the traditional stories on which tragedies are previous Chapter. From the point of view, however, of its quantity, i.e. the separate sections into which it is divided, a tragedy has the following parts: Prologue, Episode, judgement, of the number of the

FIG. 6b

ANIMATED PAGE TURNING

CROSS-REFERENCES TO RELATED APPLICATIONS

This application claims the benefit of U.S. Provisional Application 61/407,398, filed Nov. 11, 2010, and U.S. Provisional Application 61/447,616, filed Feb. 28, 2011, the contents of which are incorporated by reference herein in their entirety.

BACKGROUND

Field of Disclosure

This disclosure relates in general to digital reading devices, and in particular to page-turning animations on such devices.

Description of the Related Art

Digital reading devices allow users to read books or other documents on an electronic display. When a user finishes reading a page of a book or document, some digital reading devices allow the user to transition to the next page by touching the display. In addition, some digital reading devices display a "page-turning" animation when transitioning to another page. The page-turning animation emulates the turning of a page of a real book, providing a fun and interactive experience for users. Unfortunately, realistic page-turning animations are often computationally-demanding, exceeding the processing ability of many digital reading devices. As a result, many implementations of page-turning animations on touch-sensitive digital reading devices are unrealistic, failing to accurately account for the user's real-time interactions with the page.

SUMMARY

The above and other issues are addressed by a method, computer, and computer-readable storage medium storing instructions for showing a page turn animation in connection with a digital content page displayed by a digital reading device display. Embodiments of the method comprise receiving page turn input information indicating a location on the display from which a page turn input is received. A virtual cylinder is generated having a location based at least in part on the page turn input information. The digital content page is projected onto the cylinder. The generated cylinder is rendered on the display of the digital reading device. The page is textured onto the rendered cylinder responsive to the projection.

Embodiments of the computer-readable storage medium store executable computer program instructions for receiving page turn input information indicating a location on the display from which a page turn input is received. The instructions generate a virtual cylinder having a location based at least in part on the page turn input information. The instructions project the digital content page onto the cylinder. The instructions render the generated cylinder on the display of the digital reading device. The instructions texture the page onto the rendered cylinder responsive to the projection.

Embodiments of the digital reading device comprise a non-transitory computer-readable storage medium storing executable computer program instructions for receiving page turn input information indicating a location on the display from which a page turn input is received. The instructions generate a virtual cylinder having a location based at least in part on the page turn input information. The instructions project the digital content page onto the cylinder. The instructions render the generated cylinder on the display of the digital reading device. The instructions texture the page onto the rendered cylinder responsive to the projection. The digital reading device additionally comprises a processor for executing the computer program instructions.

BRIEF DESCRIPTION OF DRAWINGS

FIG. 6a is an exemplary screenshot of a page turn animation in a first position in landscape mode, according to one embodiment.

FIG. 6b is an exemplary screenshot of a page turn animation in a second, subsequent position in landscape mode, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
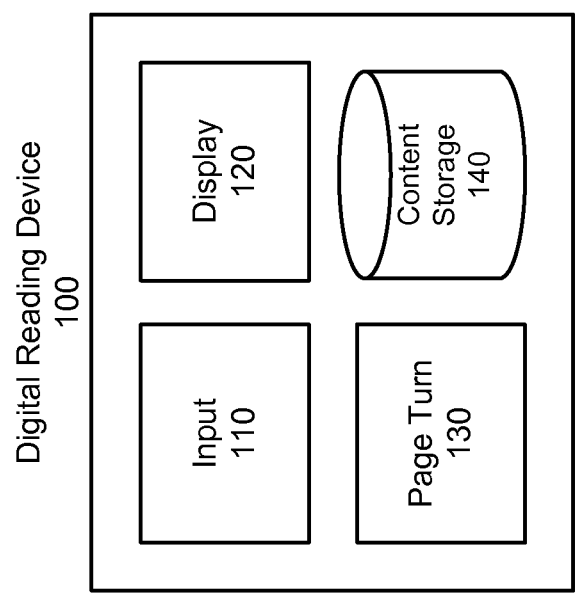
FIG. 1 is a high-level block diagram illustrating a digital reading device for providing a page turn animation according to one embodiment.

FIG. 1 is a high-level block diagram illustrating a digital reading device 100 for providing a page turn animation according to one embodiment. As shown, the system includes input module 110, display module 120, page turn module 130, and content storage module 140. There can be other entities in digital reading device 100, and one or more modules may be combined, for instance input module 110 and display module 120 may be implemented in a single module. Digital reading device 100 is a special or general purpose reading device, such as a dedicated e-reader, tablet computer, or a mobile phone, having a display that displays content. Digital reading device 100 displays a page turn animation when a reader turns a page of digital content, providing a fun, interactive, immersive experience related to devices that do not provide such page turns.

The input module 110 receives a page turn input from a user of digital reading device 100. In one embodiment, digital reading device 100 includes touch-sensitive display functionality, allowing a user to interact with the device by touching the device's display. In such an embodiment, a page turn input is a finger-swipe on the display indicating a desire by the user of the digital reading device to transition to the next page of content. Input module 110 detects a page turn input, and in response, the next page of the content is displayed in conjunction with a page turn animation. Input module 110 may additionally be able to detect page turn input information such as the position, direction, and speed of the page turn input on the display. For instance, if a user drags a finger across the display to turn the page, input module 110 may detect the initial location of the finger on the display, the direction and intermittent locations of the finger on the display, the speed of the finger motion on the display, and the final position of the finger on the display. Input module 110 communicates page turn input information to page turn module 130.

Display module 120 displays digital content, digital reading device graphical user interfaces (GUIs), and page turn animations. In one embodiment, display module 120 displays content comprising one or more pages, such as a book or document stored in content storage module 140, within a GUI on the digital reading device display. In one embodiment, a page turn animation is received from page turn module 130 and is displayed on the digital reading device display by display module 120. After a page turn animation is displayed, display module 120 displays the next or previous page of content. For instance, if the displayed content is a current page of the book, and a user wishes to turn the page of the book, display module 120 may display the current page, then may display the page turn animation and subsequent page of the book. Display module 120 may display a single page of content, or may display multiple pages of content at a time. For example, display module 120 may display one page of content when the digital reading device is held upright ("portrait mode"), and may display two pages of content, one on either side of a virtual binding (emulating two facing pages of content within a physical book) when the digital reading device is held horizontally ("landscape mode").

Page turn module 130 receives page turn input information from input module 110 and displays a page turn animation based on the information. In one embodiment, the page turn animation is a function of an initial page turn input location on the display, the direction of a page turn input on the display, the speed of a page turn input on the display, and/or the final page turn input location on the display. Accordingly, the received page turn input information may indicate a location on the display from which a page turn input is received. In such an embodiment, page turn module 130 adaptively tracks the movement of a page turn input on the display and produces a page turn animation that responds to the movement of the page turn input in real-time.

Content storage module 140 stores content capable of being displayed on a digital reading device. Content stored in content storage module 140 may be retrieved from the internet or elsewhere. Content stored in content storage module 140 may comprise books, magazines, newspapers, documents, or any digital form of content typically comprising one or more pages. "Page" as used herein refers to an image rendered on the display, which may be a literal page image or may be any portion of content stored in content storage module 140.

Figure 2:
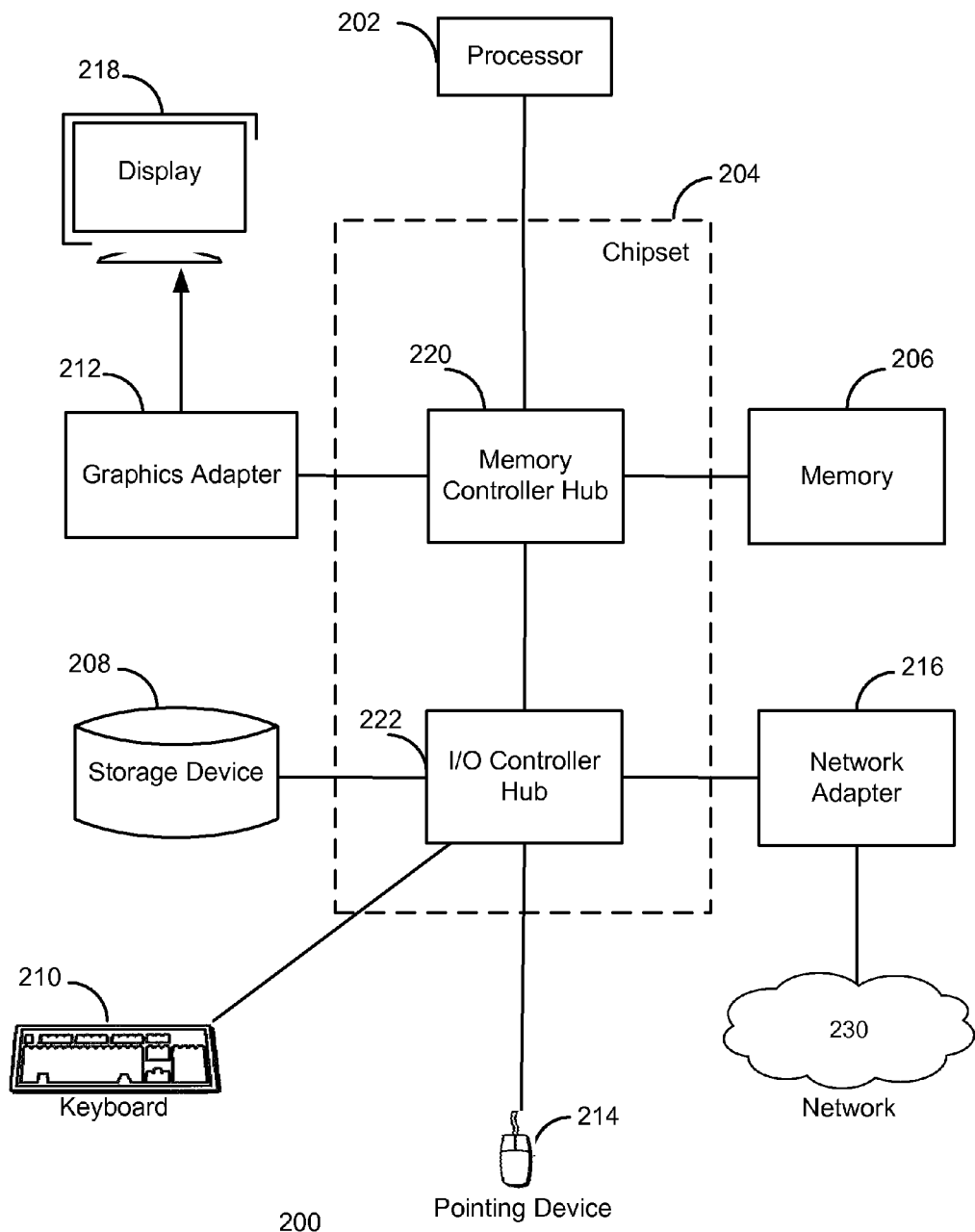
FIG. 2 is a high-level block diagram illustrating a typical computer for use as a page turn system according to one embodiment.

FIG. 2 is a high-level block diagram illustrating a typical computer 200 for use as a digital reading device 100 on which the page turn module 130 executes. Illustrated are a processor 202 coupled to a chipset 204. Also coupled to the chipset 204 are a memory 206, a storage device 208, a keyboard 210, a graphics adapter 212, a pointing device 214, and a network adapter 216. In one embodiment, the functionality of the chipset 204 is provided by a memory controller hub 220 and an I/O controller hub 222. A display 218 is coupled to the graphics adapter 212 and may be coupled to the I/O controller hub 222.

In one embodiment, the memory 206 is coupled directly to the processor 202 instead of the chipset 204, or is located within processor 202, such as in a system-on-a-chip environment. Processor 202 may be a special-purpose dedicated processor, such as an application-specific integrated circuit (ASIC), or a customizable general-purpose processor, such as an field-programmable gate array (FPGA). Processor 202 may also be a commercially available central processing unit (CPU) or graphics processing unit (GPU), with one or more processor cores. The graphics adapter 212 or processor 202 may provide hardware-based graphics acceleration, and may support application programming interfaces (APIs) for writing applications that produce 2D and 3D graphics, such as OpenGL.

The display 218 may include touch-sensitive input functionality. In this context, the display 218 may be mapped to a pre-defined grid used to determine the location, direct and speed of a touch input. In such an embodiment, computer 200 may lack other input devices, such as keyboard 210 and pointing device 214. In addition, embodiments of computer 200 may lack chipset 204, storage device 208, graphics adapter 212, and network adapter 216.

The storage device 208 is a non-transitory computer-readable storage medium, such as a hard drive, compact disk read-only memory (CD-ROM), DVD, or a solid-state memory device. The storage device 208 can be local and/or remote from the computer 200 (such as embodied within cloud storage). The memory 206 holds instructions and data used by the processor 202. The graphics adapter 212 displays images and other information on the display 218. The network adapter 216 couples the computer 200 to the network 230.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Architectural Overview of the Page Turn Module

Figure 3:
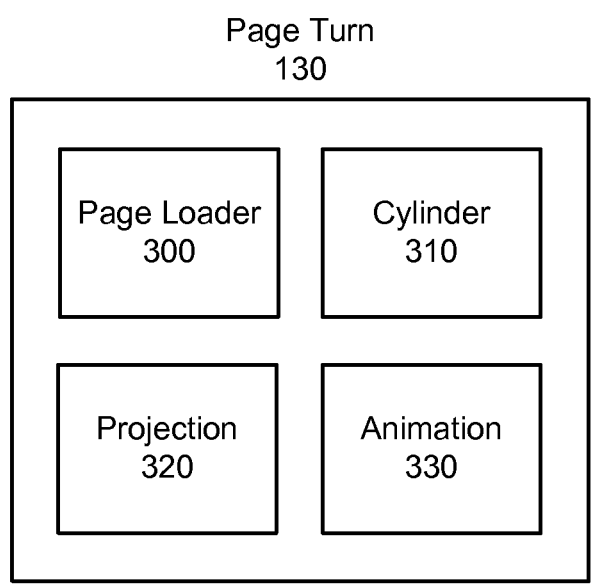
FIG. 3 is a block diagram illustrating the components of a page turn module according to one embodiment.

FIG. 3 is a block diagram illustrating the components of page turn module 130 according to one embodiment. Some embodiments of page turn module 130 have different and/or other modules than the ones described herein. Similarly, the functions can be distributed among the modules or can be performed by other entities in accordance with other embodiments in a different manner than is described here.

Page loader module 300 retrieves content pages from content storage module 140. In order to increase the performance of the page turn animation, pages not currently displayed may be retrieved in advance in order to reduce the latency between when a page turn input is received and when the page turn animation is displayed. For instance, in addition to the current page or pages displayed, page loader module 300 may retrieve the contents of previous and subsequent pages in advance of a user requesting the previous or subsequent pages via a page turn. In portrait mode, only one page is displayed on a digital reading device at a time, and one or more previous and subsequent pages are retrieved in advance. In landscape mode, two pages are displayed on a digital reading device at a time and two previous and two subsequent pages are retrieved in advance. When a page turn input is received, page loader module 300 may provide a page retrieved in advance to animation module 330 and may retrieve additional pages in advance. In addition, page loader module 300 may maintain previously displayed pages in the event that a user requests the display of previously displayed pages in the future.

Cylinder module 310 generates a three-dimensional virtual cylinder for use in rendering page turn animations. The generated cylinder is drawn over the current page displayed on the digital reading device display during the page turn animation. In one embodiment, the cylinder is generated using the OpenGL ES API. The cylinder's initial location on the current page, angle on the current page, and radius are computed based on the initial location of the page turn input (e.g., the initial location of a touch input) on the digital reading device display. Cylinder module 310 may recompute these cylinder parameters based on the movement, direction, and speed of the page turn input. In one embodiment, if the page turn input is dragged from the right side of the display to the left side, recomputing the cylinder location may cause the cylinder to appear to "roll" from the right side of the page to the left side, creating a forwards page turn animation. Similarly, if the page turn input is dragged from the left side of the display to the right side, recomputing the cylinder location may cause the cylinder to appear to roll from the left side of the page to the right side, creating a backwards page turn animation.

In one embodiment, all or part of a digital reading device display is quantized into a grid of distinct display locations having fewer locations than are supported by the display. For instance, the display may be divided into a 20×30 grid of evenly-spaced cells, even though the display itself supports a greater number of locations. All page turn inputs located within a display location (e.g., within the same cell of the grid) are treated as having the same location. The cylinder's parameters may be recomputed each time a page turn input moves from a first display location to a second display location. For instance, if a digital reading device comprises ten display locations equally spaced from the right side of the digital reading device display to the left side, an initial cylinder location, angle and radius are computed and a cylinder is drawn over the current page for a page turn input detected in the rightmost display location. As the page turn input moves across the digital reading device display, for instance a user dragging a finger from the rightmost portion of the display to the leftmost portion, the cylinder parameters are recomputed nine total times, once for each time the page turn input moves to a new display location. It should be emphasized that a digital reading device display may be divided into any level of grid granularity.

In one embodiment, a discrete number of page turn input speeds is pre-determined. In such an embodiment, a pre-determined speed is selected which best represents the page turn input speed on the digital reading device display. For example, the speed ranges of a page turn input, such as a finger moving across a display, may be pre-determined, such as 0 inches/second to 1 inch/second, 1 inch/second to 2 inches/second, and so forth. In such an embodiment, the speed range which a page turn input speed falls within is selected. The cylinder's parameters may be recomputed based on the selected pre-determined speed, and may be recomputed each time the page turn input speed changes. Any number of page turn input speeds may be pre-determined. The equations used to compute the cylinder's parameters are discussed below.

Projection module 320 projects the page onto the cylinder to create the visual effect of the page being turned. Each recomputation of cylinder parameters by cylinder module 310 comprises a distinct page turn animation frame. For each animation frame, projection module 320 determines for each page location a corresponding location on the surface of the cylinder generated by cylinder module 310. For example, for a page divided into a pre-determined grid comprising 20×30 page locations, a corresponding cylinder surface location is determined for each of the 600 page locations.

Animation module 330 displays the page turn animation on the digital reading device display. Displaying the page turn animation comprises rendering the cylinder generated by cylinder module 310 and texturing page location contents onto the corresponding cylinder surface locations determined by projection module 320 for each animation frame in the page turn animation. In portrait mode, the page is textured on the inside surface of the cylinder, and is inversely textured on the outside surface of the cylinder to create the visual effect of a transparent page, with page content displayed in reverse. In landscape mode, the page to the right of the virtual binding is textured on the inside surface of the cylinder, and the subsequent page on the left side of the virtual binding is retrieved from page loader module 300 and textured on the outside surface of the cylinder. For backwards page turn animations in landscape mode, the page to the left of the virtual binding is textured on the inside surface of the cylinder, and the preceding page on the right side of the virtual binding is retrieved from page loader module 300 and textured on the outside surface of the cylinder.

In one embodiment, animation module 330 utilizes the OpenGL ES API to texture the contents of a page location onto a corresponding cylinder surface location. Animation module 330 may texture page contents onto a cylinder surface using a transparent border in order to improve antialiasing in the page turn animation. Animation module 330 may also implement shading in the projection of a page onto a cylinder surface. In one embodiment, shading is implemented by texturing a semi-transparent gradient that extends from the page textured on the bottom of the cylinder outward, past the furthest extent of the page textured on the cylinder.

Animation module 330 displays the contents of pages retrieved in advance by page loader module 300 when displaying the page turn animation. For example, in portrait mode, when a user is turning a page to advance to a subsequent page, animation module 330 displays contents of the subsequent page underneath the page turn animation. Likewise, in landscape mode, animation module 330 displays the contents of the subsequent right page underneath the page turn animation.

Figure 4B:
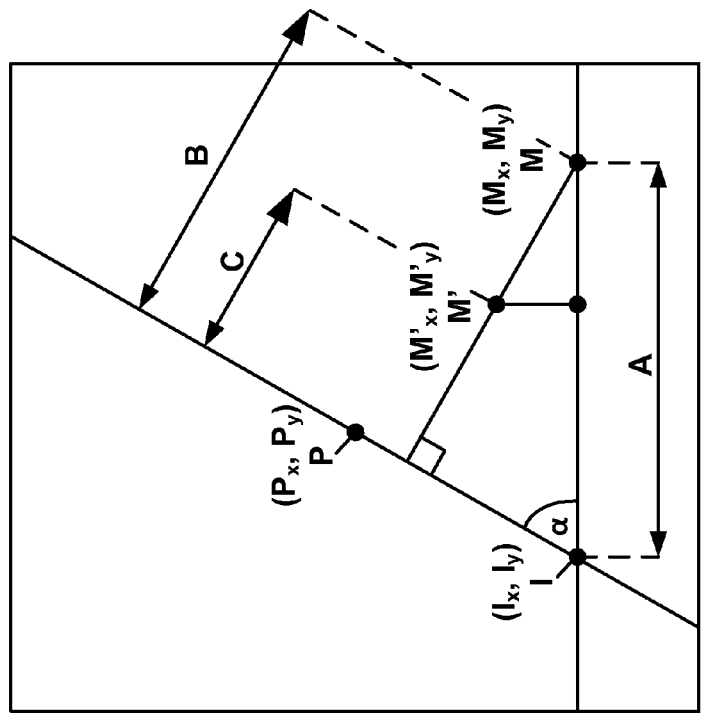
FIG. 4b is a diagram illustrating an overhead view of a virtual cylinder on a page, according to one embodiment.
Figure 4A:
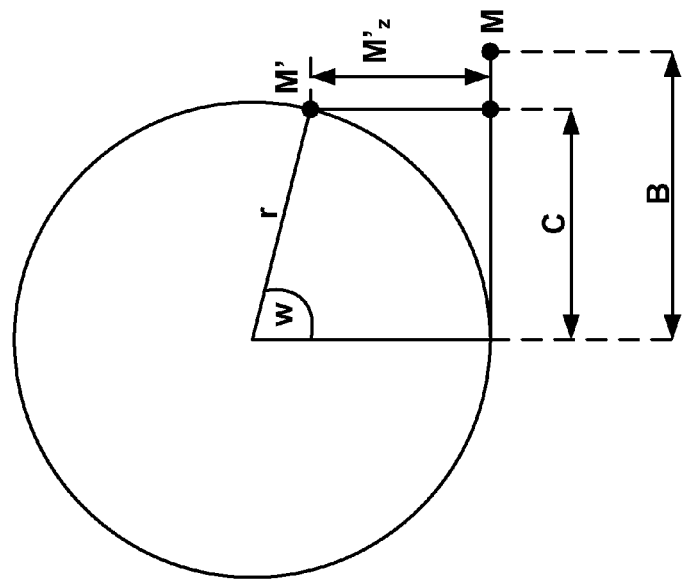
FIG. 4a is a diagram illustrating a cross-sectional view of a virtual cylinder on a page, according to one embodiment.

FIG. 4 describes the geometry used by the components of page turn module 130 to produce a page turn animation. Specifically, FIG. 4a is a diagram illustrating a cross-sectional view of a virtual cylinder on a page, according to one embodiment. FIG. 4b, in turn, is a diagram illustrating an overhead view of a virtual cylinder on a page, according to one embodiment. In FIG. 4a, the distance r represents the radius of the virtual cylinder. In FIG. 4b, the point P represents the location of the cylinder on the page, and the angle α represents the orientation of the cylinder with respect to the page. In FIG. 4b, the line containing P represents the contact line between the bottom of the cylinder and the page.

In one embodiment, the location of the virtual cylinder on the page, P, is the same as the location of the page turn input. The value of P is mapped to a quantized page turn input location, and has an x-coordinate value ($P_x$) and a y-coordinate value ($P_y$). Mapping to a quantized page turn input location is done by determining an x-axis range and a y-axis range for the display and linearly approximating the page turn input's position on the display's pre-determined grid to determine the values of $P_x$ and $P_y$. For example, if a page turn input was located in the middle of a digital reading device display, P may be the midpoint of the x-axis and y-axis range values, or may be linearly mapped to a multiple of the midpoint of the x-axis and y-axis range values.

In one embodiment, the display's x-axis ranges from a value of "1" on the right side of the x-axis to a value of "0" or "−0.5" on the left side of the x-axis. Quantifying a page turn input as a negative value may result in a negative value for P, and may result in a cylinder being generated outside the bounds of the content page. Generating a cylinder outside the bounds of the content page is desirable, since a portion of the cylinder rendered within the bounds of the content page may cause content projected onto the cylinder to block the view of a subsequent page. By generating a cylinder outside the bounds of the content page in certain circumstances (such as the end of the page turn animation), no portion of the cylinder will be rendered within the bounds of the content page, and the view of a subsequent page will not be blocked. In one embodiment, the display's y-axis ranges from a value of "1" at the top of the y-axis to a value of "0" on the bottom of the y-axis. For backwards page turn animations, P may be computed the same as forwards page turn animations. For example, if a page turn input moves from left to right, the x-axis may range from a value of "−0.5" to "1". Alternatively, the x-axis range for quantized page turn input location may be inverted, for instance from a value of "1" on the left side of the x-axis to a value of "0" or "−0.5" on the right side of the x-axis.

In one embodiment, the location of P is adjusted relative to the location of the page turn input to better track the page turn input (such as a finger on the display), increasing the realism of the page turn animation. In one embodiment, the adjustment may be implemented for page turn inputs on only certain portions of the display. For example, there may be a 20% left bias adjustment to P for page turn input positions on the right side of the display, and no adjustment for page turn inputs on the left, top or bottom of the display. Likewise, adjustments to P may be linearly interpolated based on the position of a page turn input on a display, being applied more or less prominently as the page turn input moves on the display. Further, P may be adjusted using entry tables or models which map the magnitudes of adjustment to particular regions of the display, and which may themselves be interpolated between regions of the display.

The initial angle of the cylinder, $\alpha$, is determined based on the initial location of the page turn input on the display. For example, the value of $\alpha$ may be $\pi/2$ radians if the initial location of the page turn input is directly between the top and the bottom of the screen, or is anywhere on the left side of the screen. If the page turn input is on the top right corner of the display, the value of $\alpha$ may be $(1.3*\pi/2)$ radians, and if the page turn input is on the bottom right corner of the display, the value of $\alpha$ may be $(0.7*\pi/2)$ radians. Further, values of $\alpha$ may be linearly interpolated across the y-axis and recomputed based on page turn input position. For instance, if a page turn input moves from the top right corner of the display to the top left corner of the display, $\alpha$ may be linearly interpolated from a value of $(1.3*\pi/2)$ radians to $\pi/2$ radians. Alternatively, recomputing $\alpha$ may be based on page turn input direction. For example, if a page turn input moves upwards or downwards on the left side of the display, $\alpha$ may not change, but if a page turn input moves rightwards or leftwards on the display, $\alpha$ may change. For backwards page turn animations, $\alpha$ may be computed the same as forwards page turn animations (resulting in forwards page turn animations displayed in reverse), or the x-axis angle value range may be inverted (resulting in page turn animations simulating a page turn from the left to the right).

The radius of the cylinder, r, is initially determined and recomputed based on the position of the page turn input on the display. In one embodiment, in portrait mode, r is linearly interpolated across the display's x-axis, from a value of (0.25*display width) for a page turn input on the right side of the display to a value of (0.47*display width) for a page turn input on the left side of the display. In one embodiment, in landscape mode, r is exponentially interpolated across the display's x-axis, from a value of (0.075*display width) on the right side of the display to a value of (4*display width) on the left side of the display. Alternatively, r may be recomputed based on the direction of the page turn input. For example, r may increase if the page turn input moves leftwards and may decrease if the page turn input moves rightwards. For backwards page turn animations, r may be computed the same as forwards page turn animations, or may be computed the opposite of forwards page turn animations, with larger radii computed for page turn inputs on the right side of the display than for page turn inputs on the left side of the display.

When the digital reading device is operating in landscape mode, page turn module 130 may additionally compute a rotation parameter, "rot", to use in adjusting the cylinder as the page rotates around the virtual binding. The rotation parameter represents a three-dimensional rotation around the virtual binding between the two facing pages, and increases the page turn animation's realism for page turn input positions to the left of the virtual binding by simulating the unfolding of a page as the page is rotated around the binding. In one embodiment, the rotation parameter is based on the page turn input position, and is exponentially interpolated across the display's x-axis, from an angle of 0 on the right side of the display to an angle of $\pi/18$ radians in the middle of the display, to an angle of $\pi$ radians on the left side of the display. For backwards page turn animations, the rotation parameter may be computed the same as forwards page turn animations, or may be computed the opposite of forwards page turn animations, with the x-axis angle range inverted.

Page turn module 130 may recompute cylinder parameters any number of times for a single page turn animation. In one embodiment, the number of cylinder recomputations is fixed for each page turn animation. For example, cylinder parameters may be recomputed 20 times as the page turn input moves from the right side of the display to the left side. In such an example, the cylinder may be recomputed for only leftward page turn input movement. In one embodiment, the number of cylinder recomputations is based on the speed of the page turn input movement on the display. For example, the number of cylinder recomputations for a user quickly swiping a finger across the digital reading device display may be lower than the number of cylinder recomputations for a user slowly swiping a finger across the display. In one embodiment, page turn module 130 recomputes cylinder parameters each time a page turn input is received at a new location. For instance, if a user swipes a finger on a digital reading device display, cylinder parameters are recomputed until a user removes the finger from the display.

In the embodiment of FIG. 4a and FIG. 4b, a cylinder surface location M' is determined for each corresponding page location M. In FIG. 4a, the distance B represents the distance between M and bottom of the cylinder perpendicular to the long axis of the cylinder. Likewise, the distance C represents the perpendicular distance between the point on the page immediately below M' and the bottom of the cylinder. The angle w represents the angle between the cross-sectional radius containing M' and the cross-sectional radius to the page. The distance $M'_z$ represents the z-coordinate of the point M'. In FIG. 4b, the distance A represents the horizontal distance between M and the line containing P (the line representing the bottom of the cylinder on the page). The point I represents the intersection of the horizontal line containing M and the line containing P. As discussed above, the angle α represents the orientation of the line containing P relative to the horizontal line containing M. In the embodiment of FIG. 4a and FIG. 4b, the point M comprises the coordinates $(M_x, M_y)$, the point M' comprises the coordinates $(M'_x, M'_y, M'_z)$, and the point I comprises the coordinates $(I_x, I_y)$.

In one embodiment, page turn module 130 computes values of the cylinder variables discussed in FIGS. 4a and 4b as follows:

$$I_x = P_x + \frac{M_y - P_y}{\tan(\alpha)} \quad (1)$$

$$I_y = M_y \quad (2)$$

$$A = M_x - I_x \quad (3)$$

$$B = A * \sin(\alpha) \quad (4)$$

$$w = \frac{B}{r} \quad (5)$$

$$C = r * \sin(w) \quad (6)$$

$$M'_x = M_x - (B - C) * \sin(\alpha) \quad (7)$$

$$M'_y = M_y + (B - C) * \cos(\alpha) \quad (8)$$

$$M'_z = M_z + r - r * \cos(w) \quad (9)$$

$$M'_x = \\ (M_z + r - r*\cos(w))*\sin(rot) + (M_x - (B-C)*\sin(\alpha))*\cos(rot) \quad (10)$$

$$M'_y = M_y + (B - C) * \cos(\alpha) \quad (11)$$

$$M'_z = \\ (M_z + r - r*\cos(w))*\cos(rot) - (M_x - (B-C)*\sin(\alpha))*\sin(rot) \quad (12)$$

In one embodiment, page turn module 130 utilizes sine function approximation in order to improve computation performance of the above equations. Further, page turn module 130 may use the following equality to further improve computation performance:

$$\cos(\alpha) = \sin\left(\left(\frac{\pi}{2}\right) - a\right) \quad (13)$$

Figure 5:
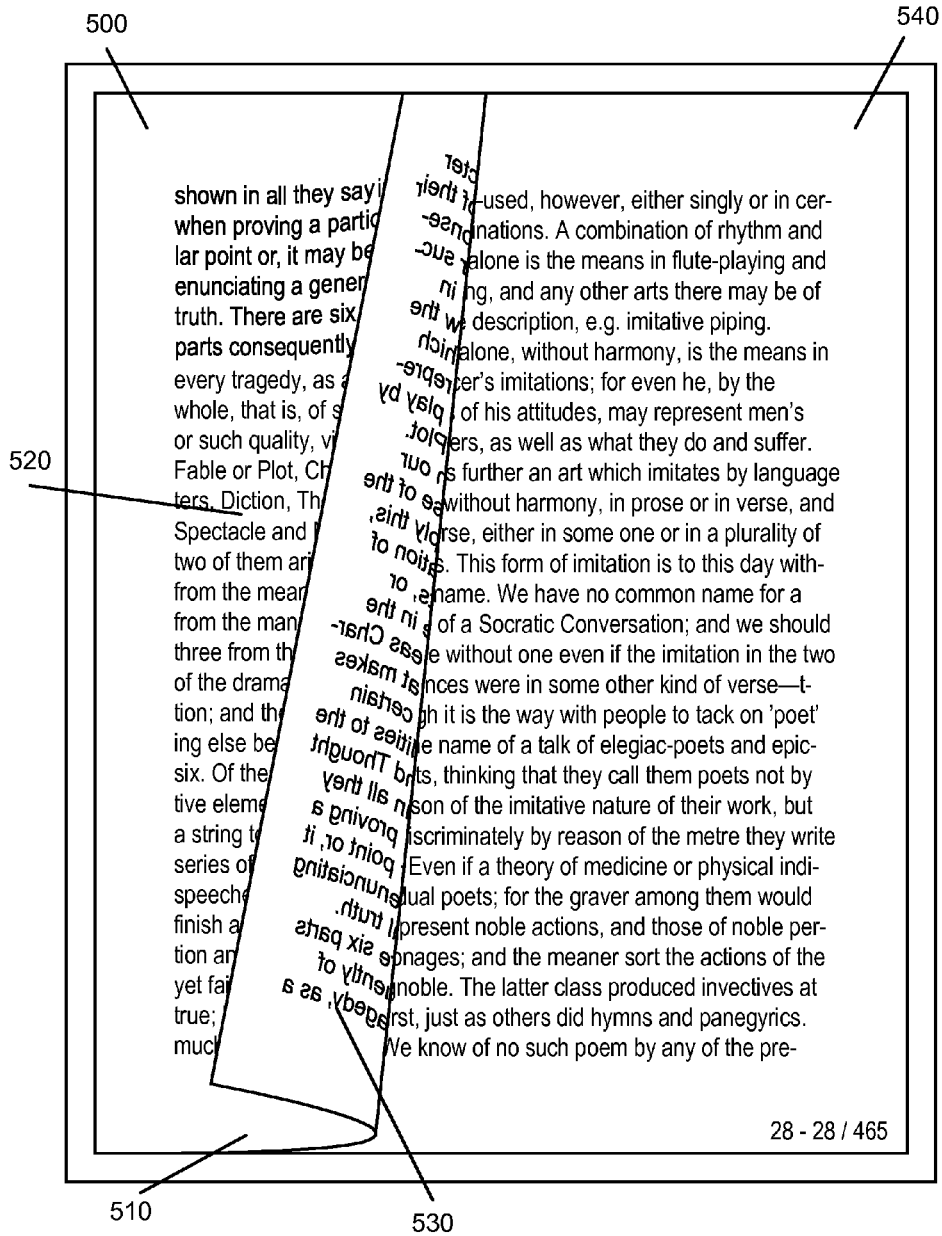
FIG. 5 is an exemplary screenshot of a page turn animation in portrait mode, according to one embodiment.

FIG. 5 is an exemplary screenshot of a page turn animation in portrait mode, according to one embodiment. In the embodiment of FIG. 5, a current page 500 is displayed with a virtual cylinder 510 rendered on the current page 500. Current page content 520 is textured on the inside of the virtual cylinder 510. Current page content 530 is textured in reverse on the outside of the virtual cylinder 510. Beneath the page turn animation, a subsequent page 540 is displayed.

FIG. 6a is an exemplary screenshot of a page turn animation in a first position in landscape mode, according to one embodiment. FIG. 6b is an exemplary screenshot of a page turn animation in a second, subsequent position in landscape mode, according to one embodiment. The embodiments of FIG. 6a and FIG. 6b occur in the same page turn animation. In the embodiment of FIG. 6a, a left current page 600 and a right current page 620 are displayed with a virtual cylinder 610 rendered on right current page 620. The content of the right current page 620 is textured on the inside of the virtual cylinder 610. The content of a left subsequent page 630 is textured on the outside of the virtual cylinder 610. Beneath the page turn animation, a right subsequent page 640 is displayed. In the embodiment of FIG. 6b, the virtual cylinder 610 is rendered on the left current page 600, creating the effect of a virtual cylinder rolling across the current pages 600 and 620 from the right to the left.

Figure 7:
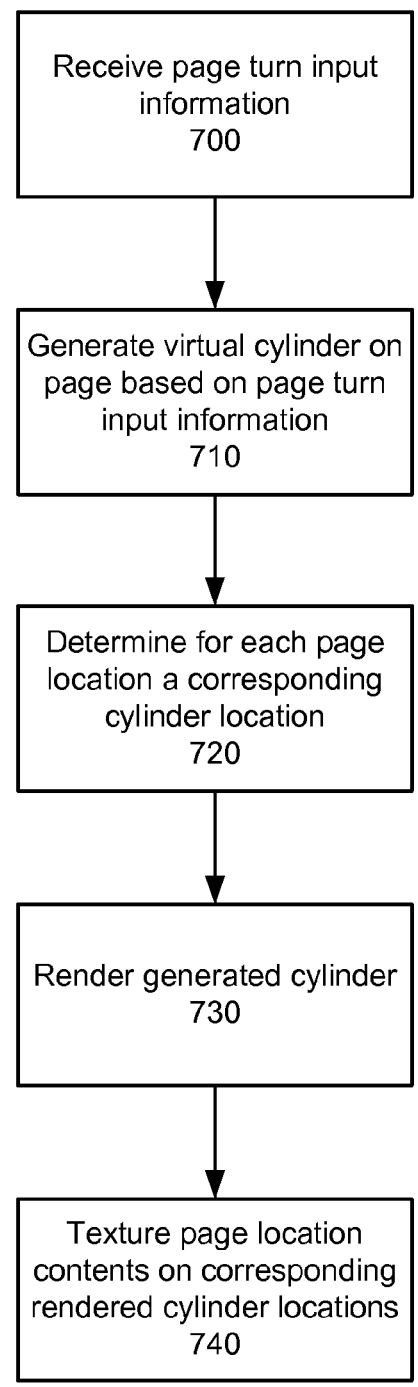
FIG. 7 is a flowchart illustrating a method of producing a page turn animation frame according to one embodiment.

FIG. 7 is a flowchart illustrating a method of producing a page turn animation frame according to one embodiment. The method of FIG. 7 may be implemented multiple times in a single page turn animation, once for each page turn animation frame. The steps described in FIG. 7 may be performed in any order, and fewer or additional steps may be performed in producing a page turn animation frame.

In step 700, page turn input information specifying a location of a page turn input is received. In one embodiment, the page turn input is a touch input on the touch-sensitive display of a digital reading device. The page turn input information may include the location of the page turn input on the display of the device, as well as the speed and direction of the page turn input. In step 110, a virtual cylinder is generated based on the page turn input information. The cylinder's location, orientation and size are computed for rendering the cylinder on a page displayed on the digital reading device. In step 720, for each location of the page, a corresponding cylinder surface location is determined for projection of the page onto the cylinder. In step 730, the generated cylinder is rendered, and in step 740, the contents of each page location are textured on the rendered cylinder at the corresponding cylinder surface location.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of showing a page turn animation in connection with a digital content page displayed by a digital reading device display, comprising:
   receiving page turn input information indicating a location on the display from which a page turn input is received, wherein the page turn input information further indicates a direction and speed of the page turn input on the device display;
   selecting, based on the speed of the page turn input, a pre-determined speed that represents the speed of the page turn input;
   generating a virtual cylinder having a location and radius that are determined based at least in part on the direction of the page turn input that is indicated by the page turn input information and the pre-determined speed, the virtual cylinder configured to move from a right edge of the digital content page to a left edge of the digital content page during the page turn animation, wherein the radius is based on the location of the virtual cylinder on the digital content page such that the radius increases from a smallest radius associated with a first location of the virtual cylinder at the right edge of the digital content page to a largest radius associated with a second location of the virtual cylinder at the left edge of the digital content page, the virtual cylinder being generated by recomputing the location and radius of the virtual cylinder a quantity of times that is determined based on the pre-determined speed;

projecting the digital content page onto the cylinder;

rendering the generated cylinder on the display of the digital reading device; and texturing the page onto the rendered cylinder responsive to the projection.

2. The method of claim 1, wherein the display comprises a touch-sensitive display and wherein the page turn input information indicates a location of touch input where a user touched the display and a speed and location of the touch input.

3. The method of claim 1, further comprising receiving additional page turn input information indicating a new location on the display from which a new page turn input is received, and wherein the location of the virtual cylinder changes to reflect the new location on the display.

4. The method of claim 1, wherein generating the virtual cylinder comprises:

determining a cylinder angle relative to the displayed digital content page responsive at least in part to the page turn input information; and generating the cylinder oriented at the determined cylinder angle.

5. The method of claim 1, wherein the virtual cylinder has a cylinder angle indicating an angle of the cylinder relative to the displayed digital content page, and wherein projecting the digital content page onto the cylinder comprises:

projecting a page location of the digital content page onto a corresponding cylinder surface location determined responsive to the cylinder angle and the radius.

6. The method of claim 1, wherein two content pages are displayed by a digital reading device display simultaneously.

7. The method of claim 6, further comprising:

projecting one of the two displayed content pages and an adjacent undisplayed content page onto the cylinder;

texturing the projected displayed content page onto the inside of the rendered cylinder responsive to the projection; and texturing the projected undisplayed content page onto the outside of the rendered cylinder responsive to the projection.

8. A non-transitory computer-readable storage medium storing executable computer program instructions for showing a page turn animation in connection with a digital content page displayed by a digital reading device display, the instructions comprising instructions for:

receiving page turn input information indicating a location on the display from which a page turn input is received, wherein the page turn input information further indicates a direction and speed of the page turn input on the device display;

selecting, based on the speed of the page turn input, a pre-determined speed that represents the speed of the page turn input;

generating a virtual cylinder having a location and radius that are determined based at least in part on the direction of the page turn input that is indicated by the page turn input information and the pre-determined speed, the virtual cylinder configured to move from a right edge of the digital content page to a left edge of the digital content page during the page turn animation, wherein the radius is based on the location of the virtual cylinder on the digital content page such that the radius increases from a smallest radius associated with a first location of the virtual cylinder at the right edge of the digital content page to a largest radius associated with a second location of the virtual cylinder at the left edge of the digital content page, the virtual cylinder being generated by recomputing the location and radius of the virtual cylinder a quantity of times determined based on the pre-determined speed;

projecting the digital content page onto the cylinder;

rendering the generated cylinder on the display of the digital reading device; and texturing the page onto the rendered cylinder responsive to the projection.

9. The non-transitory computer-readable storage medium of claim 8, wherein the display comprises a touch-sensitive display and wherein the page turn input information indicates a location of touch input where a user touched the display and a speed and location of the touch input.

10. The non-transitory computer-readable storage medium of claim 8, further comprising receiving additional page turn input information indicating a new location on the display from which a new page turn input is received, and wherein the location of the virtual cylinder changes to reflect the new location on the display.

11. The non-transitory computer-readable storage medium of claim 8, wherein generating the virtual cylinder comprises:

determining a cylinder angle relative to the displayed digital content page responsive at least in part to the page turn input information; and generating the cylinder oriented at the determined cylinder angle.

12. The non-transitory computer-readable storage medium of claim 8, wherein the virtual cylinder has a cylinder angle indicating an angle of the cylinder relative to the displayed digital content page, and wherein projecting the digital content page onto the cylinder comprises:

projecting a page location of the digital content page onto a corresponding cylinder surface location determined responsive to the cylinder angle and the radius.

13. The non-transitory computer-readable storage medium of claim 8, wherein two content pages are displayed by a digital reading device display simultaneously.

14. The non-transitory computer-readable storage medium of claim 13, further comprising:

projecting one of the two displayed content pages and an adjacent undisplayed content page onto the cylinder;

texturing the projected displayed content page onto the inside of the rendered cylinder responsive to the projection; and texturing the projected undisplayed content page onto the outside of the rendered cylinder responsive to the projection.

15. A digital reading device for showing a page turn animation in connection with a digital content page displayed by the digital reading device, comprising:

a non-transitory computer-readable storage medium storing executable computer program instructions comprising instructions for:

receiving page turn input information indicating a location on the display from which a page turn input is received, wherein the page turn input information further indicates a direction and speed of the page turn input on the device display;

selecting, based on the speed of the page turn input, a pre-determined speed that represents the speed of the page turn input;

generating a virtual cylinder having a location and radius that are determined based at least in part on the direction of the page turn input that is indicated by the page turn input information and the pre-determined speed, the virtual cylinder configured to move from a right edge of the digital content page to a left edge of the digital content page during the page turn animation, wherein the radius is based on the location of the virtual cylinder on the digital content page such that the radius increases from a smallest radius associated with a first location of the virtual cylinder at the right edge of the digital content page to a largest radius associated with a second location of the virtual cylinder at the left edge of the digital content page, the virtual cylinder being generated by recomputing the location and radius of the virtual cylinder a quantity of times determined based on the pre-determined speed;

projecting the digital content page onto the cylinder;

rendering the generated cylinder on the display of the digital reading device; and texturing the page onto the rendered cylinder responsive to the projection; and a processor for executing the computer program instructions.

16. The digital reading device of claim 15, wherein the display comprises a touch-sensitive display and wherein the page turn input information indicates a location of touch input where a user touched the display and a speed and location of the touch input.

17. The digital reading device of claim 15, wherein projecting the digital content page onto the cylinder comprises:
projecting a page location of the digital content page onto a corresponding cylinder surface location determined responsive to the cylinder angle and the radius.

18. The digital reading device of claim 15, wherein two content pages are displayed simultaneously.

19. The digital reading device of claim 18, further comprising:
projecting one of the two displayed content pages and an adjacent undisplayed content page onto the cylinder;
texturing the projected displayed content page onto the inside of the rendered cylinder responsive to the projection; and
texturing the projected undisplayed content page onto the outside of the rendered cylinder responsive to the projection.

20. The digital reading device of claim 15, wherein the generated location of the virtual cylinder is outside a boundary of the digital content page.

21. The digital reading device of claim 15, wherein the page turn input information indicates a location where a user touched the display and the computer-readable medium further stores instructions comprising instructions for:
quantizing the display into a grid of cells indicating distinct display locations and having fewer locations than are supported by the display; and
mapping the location where the user touched the display into a cell of the grid.

22. The method of claim 1, further comprising:
responsive to recomputing the location and radius of the virtual cylinder, causing the virtual cylinder to appear to roll in the direction and at the speed of the page turn input.

* * * * *